(12) United States Patent
Machlitt et al.

(10) Patent No.: US 11,197,540 B2
(45) Date of Patent: Dec. 14, 2021

(54) METHOD OF MAKING A BRUSH AND BRUSH

(71) Applicant: The Procter & Gamble Company, Cincinnati, OH (US)

(72) Inventors: Michael Machlitt, Waldems (DE); Uwe Tretrop, Bad Soden (DE); Jiawei Chiu, Berlin (DE)

(73) Assignee: The Procter & Gamble Company, Cincinnati, OH (US)

( * ) Notice: Subject to any disclaimer, the term of this patent is extended or adjusted under 35 U.S.C. 154(b) by 109 days.

(21) Appl. No.: 15/634,950

(22) Filed: Jun. 27, 2017

(65) Prior Publication Data
US 2017/0367474 A1 Dec. 28, 2017

(30) Foreign Application Priority Data

Jun. 28, 2016 (EP) .................................... 16176682
Jun. 26, 2017 (WO) ................ PCT/US2017/039183

(51) Int. Cl.
*A46D 3/00* (2006.01)
*A46B 9/04* (2006.01)
(Continued)

(52) U.S. Cl.
CPC ................ *A46D 3/005* (2013.01); *A46B 3/06* (2013.01); *A46B 9/005* (2013.01); *A46B 9/04* (2013.01);
(Continued)

(58) Field of Classification Search
CPC ......... A46B 9/065; B29B 11/04; B29C 65/02; B29C 65/48; B29C 70/845; B29C 66/69; B29C 66/712
(Continued)

(56) References Cited

U.S. PATENT DOCUMENTS 2,923,598 A 2/1960 Reis, Jr. et al.
3,076,218 A 2/1963 Cook et al.
(Continued)

FOREIGN PATENT DOCUMENTS

DE 941364 C 4/1956
DE 10217527 A1 11/2003
(Continued)

OTHER PUBLICATIONS

International Search Report with Written Opinion dated Oct. 13, 2017, 12 pages.
(Continued)

*Primary Examiner* — Shay Karls
(74) *Attorney, Agent, or Firm* — Vladimir Vitenberg (57) ABSTRACT

A method of making a brush includes providing a plurality of first filaments, each having a first end and a second end; bringing the plurality of first filaments into a first predetermined shape such that the first ends are arranged side by side on a common contour; fixedly connecting the first ends so that a first pre-tuft having the first predetermined shape and a connected first end is formed; bringing a second tuft element having a first end and a second end together with the first pre-tuft into a second predetermined shape such that the first end of the second tuft element and the connected first end of the first pre-tuft are arranged side by side on a common contour; fixedly connecting the connected first end of the first pre-tuft and the first end of the at least second tuft element so that a final tuft having the second predetermined shape and a connected end is formed; and attaching the final tuft to a brush body by overmolding the final tuft's connected end with a plastic material.

16 Claims, 3 Drawing Sheets

(51) Int. Cl.

| | |
|---|---|
| *A46B 3/06* | (2006.01) |
| *A46D 1/08* | (2006.01) |
| *A46B 9/00* | (2006.01) |
| *A46B 9/06* | (2006.01) |
| *B29B 11/04* | (2006.01) |
| *B29C 65/02* | (2006.01) |
| *B29C 65/48* | (2006.01) |
| *B29C 65/00* | (2006.01) |
| *B29C 70/84* | (2006.01) |
| *B29K 607/00* | (2006.01) |
| *B29K 621/00* | (2006.01) |
| *B29K 667/00* | (2006.01) |
| *B29K 677/00* | (2006.01) |
| *B29L 31/42* | (2006.01) |

(52) U.S. Cl.
CPC ............... *A46B 9/06* (2013.01); *A46B 9/065* (2013.01); *A46D 1/08* (2013.01); *B29B 11/04* (2013.01); *B29C 65/02* (2013.01); *B29C 65/48* (2013.01); *B29C 66/69* (2013.01); *B29C 66/712* (2013.01); *B29C 70/845* (2013.01); *A46B 2200/1066* (2013.01); *B29K 2607/00* (2013.01); *B29K 2621/003* (2013.01); *B29K 2667/006* (2013.01); *B29K 2677/00* (2013.01); *B29L 2031/425* (2013.01)

(58) Field of Classification Search
USPC .......................................................... 300/21
See application file for complete search history.

(56) References Cited

U.S. PATENT DOCUMENTS

| | | | |
|---|---|---|---|
| 4,697,851 A * | 10/1987 | Takahashi | A46D 1/08 300/1 |
| 5,033,797 A | 7/1991 | Rueb | |
| 6,036,277 A * | 3/2000 | Weihrauch | A46B 3/20 15/186 |
| 6,726,789 B1 | 4/2004 | Weihrauch | |
| 6,779,851 B2 | 8/2004 | Bouchiere | |
| 6,862,771 B1 | 3/2005 | Muller | |
| 6,865,767 B1 | 3/2005 | Gavney, Jr. | |
| 7,174,596 B2 | 2/2007 | Fischer et al. | |
| 7,434,288 B2 | 10/2008 | Gavney, Jr. | |
| 7,644,466 B2 | 1/2010 | Weihrauch et al. | |
| 7,814,604 B2 | 10/2010 | Gavney, Jr. | |
| 7,861,356 B2 | 1/2011 | Kunath et al. | |
| 8,132,284 B1 | 3/2012 | Kraemer | |
| 8,677,545 B2 | 3/2014 | Vitt et al. | |
| 9,144,299 B2 | 9/2015 | Fritsch et al. | |
| 9,398,802 B2 | 7/2016 | Moskovich et al. | |
| 9,402,461 B2 | 8/2016 | Brik et al. | |
| 9,635,928 B2 | 5/2017 | Morgott | |
| 9,636,898 B2 | 5/2017 | Ganninger | |
| 9,750,334 B2 | 9/2017 | Kirchhofer et al. | |
| 2001/0023516 A1 | 9/2001 | Driesen et al. | |
| 2002/0152570 A1 | 10/2002 | Hohlbein | |
| 2003/0159224 A1 | 8/2003 | Fischer et al. | |
| 2004/0117934 A1 | 6/2004 | Pfenniger | |
| 2005/0015904 A1 | 1/2005 | Gavney | |
| 2005/0060826 A1 | 3/2005 | Gavney | |
| 2005/0155172 A1 | 7/2005 | Gavney, Jr. | |
| 2005/0160546 A1 | 7/2005 | Weihrauch | |
| 2005/0193512 A1 | 9/2005 | Moskovich et al. | |
| 2006/0080795 A1 | 4/2006 | Pfenniger et al. | |
| 2006/0129171 A1 | 6/2006 | Moskovich | |
| 2006/0230563 A1 | 10/2006 | Gavney, Jr. | |
| 2007/0094824 A1 | 5/2007 | Pfenniger et al. | |
| 2007/0256263 A1 | 11/2007 | Kunath et al. | |
| 2009/0193604 A1 | 8/2009 | Pfenniger et al. | |
| 2011/0000041 A1 | 1/2011 | Vitt et al. | |
| 2011/0010881 A1 | 1/2011 | Pfenniger et al. | |
| 2011/0030158 A1 | 2/2011 | Gavney, Jr. | |
| 2011/0258797 A1 | 10/2011 | Pfenniger et al. | |
| 2011/0304194 A1 * | 12/2011 | Uchida | A46B 9/04 300/21 |
| 2012/0246857 A1 | 10/2012 | Kato et al. | |
| 2012/0317737 A1 * | 12/2012 | Birk | A46B 3/06 15/106 |
| 2012/0317738 A1 | 12/2012 | Birk | |
| 2013/0019425 A1 | 1/2013 | Bresselschmidt | |
| 2013/0139338 A1 * | 6/2013 | Hess | A46B 9/026 15/167.1 |
| 2013/0180069 A1 | 7/2013 | Seery et al. | |
| 2013/0291320 A1 | 11/2013 | Kirchhofer et al. | |
| 2013/0326834 A1 | 12/2013 | Vankov et al. | |
| 2014/0075696 A1 | 3/2014 | Pfenniger et al. | |
| 2014/0123423 A1 | 5/2014 | Morgott | |
| 2014/0232173 A1 | 8/2014 | Birk | |
| 2014/0359956 A1 * | 12/2014 | Jungnickel | A46B 9/025 15/167.1 |
| 2014/0359957 A1 * | 12/2014 | Jungnickel | A46B 9/025 15/167.1 |
| 2015/0097309 A1 * | 4/2015 | Newman | A46B 3/06 264/40.7 |
| 2015/0150369 A1 | 6/2015 | Bresselschmidt | |
| 2015/0238004 A1 | 8/2015 | Brik | |
| 2015/0257525 A1 | 9/2015 | Kang et al. | |
| 2016/0088925 A1 | 3/2016 | Pfenniger et al. | |
| 2017/0020278 A1 | 1/2017 | Xi et al. | |
| 2017/0215567 A1 | 8/2017 | Waguespack | |
| 2017/0318947 A1 | 11/2017 | Kirchhofer et al. | |
| 2018/0000236 A1 | 1/2018 | Scheurich et al. | |
| 2018/0289140 A1 | 10/2018 | Dengler | |
| 2020/0397130 A1 | 12/2020 | Ganninger et al. | |
| 2020/0397134 A1 | 12/2020 | Ganninger et al. | |
| 2020/0397135 A1 | 12/2020 | Ganninger et al. | |
| 2020/0397136 A1 | 12/2020 | Ganninger et al. | |
| 2020/0397137 A1 | 12/2020 | Ganninger et al. | |

FOREIGN PATENT DOCUMENTS

| | | |
|---|---|---|
| DE | 102009039514 | 3/2011 |
| DE | 102012021311 A1 | 4/2014 |
| EP | 2810581 A1 | 12/2014 |
| WO | 2005115196 A2 | 12/2005 |
| WO | 2007051099 A2 | 5/2007 |
| WO | 2010025820 A2 | 3/2010 |
| WO | 2011070549 A1 | 6/2011 |
| WO | 2012174066 A2 | 12/2012 |
| WO | 2015085536 A1 | 6/2015 |
| WO | 2015183272 A1 | 12/2015 |
| WO | 2016014051 A1 | 1/2016 |
| WO | 2019011599 | 1/2019 |

OTHER PUBLICATIONS

All Office Actions, U.S. Appl. No. 16/898,313.
All Office Actions, U.S. Appl. No. 16/898,344.
All Office Actions, U.S. Appl. No. 16/898,359.
All Office Actions, U.S. Appl. No. 16/898,372.
All Office Actions, U.S. Appl. No. 16/898,382.
All Office Actions, U.S. Appl. No. 15/634,813.
Extended European Search Report and Search Opinion; Application Ser. No. 16176682.9; dated Dec. 19, 2016; 7 pages.

* cited by examiner

METHOD OF MAKING A BRUSH AND BRUSH

FIELD OF THE INVENTION

The present invention is concerned with a method of making a brush having a final tuft comprising at least two tuft elements. The present invention is also concerned with a brush comprising a final tuft that comprises at least two tuft elements.

BACKGROUND OF THE INVENTION

It is known that complex tuft structures used on brushes can provide enhanced brushing performance or at least enhanced aesthetics. E.g. so-called tuft-in-tufts can be made, where some filaments forming the tuft have different properties than other filaments of the tuft (e.g. different color or different length). Patent application EP 2 810 581 A1 generally describes examples of such complex tufts. One method of manufacturing a complex tufts is to pick individual pluralities of filaments ("pre-tufts"), push the pre-tufts into individual holders and move them together into a single holder via feeding channels, and then cut the filaments and fuse the mounting ends of all the filaments of the final tuft by application of heat. In such a manufacturing process, filaments relating to one tuft element of the final tuft may slide into the part of the single holder intended for another filament type (i.e. the different filament types may mix with each other). This diminishes the product quality and aesthetics.

It is an object of the present disclosure to provide a method of manufacturing a brush comprising a final tuft that is improved over the known manufacturing methods or at least provides an alternative to the known methods.

SUMMARY OF THE INVENTION

In accordance with one aspect there is provided a method of making a brush, in particular a toothbrush, comprising the steps of:
  providing a plurality of first filaments, each first filament having a first end and a second end;
  bringing the plurality of first filaments into a first predetermined shape such that the first ends of the first filaments are arranged side by side on a common contour;
  fixedly connecting the first ends of the plurality of first filaments so that a first pre-tuft having the first predetermined shape and a connected first end is formed;
  bringing at least a second tuft element having a first end and a second end together with the first pre-tuft into a second predetermined shape such that the first end of the second tuft element and the connected first end of the first pre-tuft are arranged side by side on a common contour;
  fixedly connecting the connected first end of the first pre-tuft and the first end of the at least second tuft element so that a final tuft having the second predetermined shape and a connected end is formed; and
  attaching the final tuft to a brush body, in particular by overmolding the connected end of the final tuft with a plastic material, thereby forming at least a portion of the brush body.

In accordance with one aspect there is provided a brush having at least one final tuft having a first end and a second end, the final tuft being attached to a brush body with its first end, wherein the final tuft comprises a first pre-tuft and at least a second tuft element that are fixedly connected with each other, the first pre-tuft comprising a plurality of first filaments that are fixedly connected on first ends of the first filaments, and the second tuft element having a first end fixedly connected with the connected first ends of the first pre-tuft.

BRIEF DESCRIPTION OF THE DRAWINGS

The present disclosure is illuminated by a detailed description of example embodiments of the proposed method and brush, where reference is made to figures. In the figures

DETAILED DESCRIPTION OF THE INVENTION

In a method of making a brush as herein proposed, at least a first pre-tuft is made that comprises a plurality of (i.e. at least two or more) first filaments having a connected first end so that the first filaments are non-separable from each other without destroying the first pre-tuft. This first pre-tuft is then connected with a second tuft element, where the second tuft element may be another pre-tuft made from a plurality of filaments, an elastomeric element, a sponge-like element, a single filament or a plurality of loose filaments etc. The final tuft resulting from this particular method has precisely separated tuft elements. For example, the filaments of the first pre-tuft do not mix with the filaments of a second pre-tuft as at least the first pre-tuft is provided as a fixedly connected tuft element before the final tuft is formed. In some embodiments, each of at least two tuft elements are a pre-tuft having a connected end It is stated here that "plurality of filaments" does not imply that the filaments are each identical (even though this shall not be excluded), but the plurality of filaments may be a mixture of different filaments. E.g. one of the filaments may have a different diameter than another one of the filaments. The filaments may also be made from different materials, may have different cross-sectional shapes etc. In some embodiments, the filaments of the plurality of filaments are all essentially identical. Where in the present disclosure "plurality of filaments" is used, this can refer to a plurality of first filaments, a plurality of second filaments etc.

"Filaments" as used in the present disclosure may have a diameter in the range of between 0.01 mm to 5 mm, in particular in the range of between 0.05 mm to 0.25 mm. The filaments may have a length in the range of 2 mm to 25 mm, in particular in the range of between 5 mm and 15 mm Filaments may have a cross sectional shape (i.e. a shape in a plane perpendicular to the length extension direction of the filament) that is circular, oval or elliptical, rectangular, square, triangular, x-shaped etc. Filaments may be made from a single plastic material, in particular thermoplastic material, where examples are polyamide (e.g. PA 6 or PA 12), polybutylene terephthalate (PBT), natural rubber or thermoplastic elastomer (TPE) or they may be made from two or more materials (e.g. by means of co-extrusion or by coating of a single material filament). The filaments may have a constant shape over their length or the shape may change, e.g. the filaments may taper towards one end (e.g. towards their second end) or the filaments may comprise a spliced second end. The filaments may comprise an anti-bacterial compound such as a silver ion source (e.g. silver nano-particles). The filaments may be structured, e.g. they may be crimped or dimpled or the filaments may be twisted. The filaments may comprise a colored coating that wears when the brush is used and can thus indicate a need to replace a worn brush.

The first filaments of the first pre-tuft become fixedly connected with each other at the first ends of the first filaments. During the manufacturing process, the first ends of the first filaments become arranged in a side-by-side manner on a common contour, in particular a flat contour, but a curved contour shall not be excluded. The first filaments may be held together by a holder, e.g. they may be pushed into a bore hole or they may be held by a gripper. The first ends are then fixedly connected so that the first pre-tuft is formed having a first predetermined shape. The connected first end of the first pre-tuft has essentially the same shape as the first pre-tuft, i.e. the connected first end does not extend beyond the first pre-tuft in a width direction. The step of fixedly connecting the first ends of the first filaments may comprise applying heat to the first ends so that the first ends at least partially melt and the molten material connects and forms an essentially non-separable connected first end when the molten material cools and solidifies. Heat may be applied in various ways, e.g. by intense light (e.g. a laser beam), heat convection, IR radiation, a hot gas stream etc. Here "non-separable" means that a first filament can essentially not be separated from the first pre-tuft without destroying the first pre-tuft. Alternatively or additionally, the step of fixedly connecting the first ends of the first filaments may comprise applying an adhesive to the first ends of the filaments. An adhesive may in particular be used in cases where the first filaments are at least partially made from a material that does not melt or the melting point of the material of different first filaments is too different from each other or the materials of different first filaments are not affine with each other and would not connect.

In some embodiments, at least the first pre-tuft has a recess or a bore hole/through hole extending along the full length of the first pre-tuft, which recess or bore hole/through hole is arranged for receiving a second tuft element, e.g. the first pre-tuft may have a cylindrical bore hole into which a cylindrical second tuft element can be pushed (e.g. pushed into the bore hole via the connected first end). Alternately or additionally, the first pre-tuft may be C-shaped (which means that the cross sectional shape of the first pre-tuft in a plane perpendicular to the linear extension direction of the first pre-tuft is C-like) and a second tuft element may be pushed into the open C. In some embodiments, the C-shaped first pre-tuft may be bent around the second tuft element so that the first pre-tuft finally has an O-shaped form (i.e. the arms of the C are move to touch each other), accommodating the second tuft element in the hollow center of the O. In other embodiments, two C-shaped pre-tufts are brought together so that an O-shaped combined tuft element results, where again a further tuft element may be accommodated in the hollow of the O-shaped combined tuft, but in some embodiments, the final tuft may have a hollow bore.

In some embodiments, where the second tuft element is realized as a second pre-tuft made from a plurality of second filaments, the step of fixedly connecting the first ends of the second filaments is different to the step of fixedly connecting the first ends of the first filaments. The difference may lie in a different connection technology (e.g. use of an adhesive vs. application of heat) or the same type of connection technology may be applied with different parameters (e.g. another temperature is used to fixedly connect the respective first ends of the second filaments, e.g. by a applying light of a lower intensity, or light of a different wave-length may be applied or a hot gas stream may be applied instead of light etc.) or different adhesives are used. This allows using connection technology particularly adapted for the respective pluralities of first and second filaments.

In some embodiments, the second ends of the filaments of the first pre-tuft and the second end of the second tuft element lie on different height levels. The second ends of the first filaments may lie on a plane being perpendicular to the length extension of the first pre-tuft, but this shall not rule out that the second ends lie on a curved contour or that the second ends may have an essentially random height (e.g. each filament may have a height that lies between two height range values).

In embodiments where the first pre-tuft is fixedly connected with a second tuft element and with at least one further tuft element, the connection may be performed successively, e.g. by first connecting the first pre-tuft with the second tuft element and then connecting the further tuft element with the already connected first pre-tuft and second tuft element.

In some embodiments, the connected end of the final tuft achieved by fixedly connecting the connected first end of the first pre-tuft and the first end of the second tuft element extends beyond the cross-sectional shape of the final tuft itself. Such an extended connected end allows fixedly connecting the final tuft to a carrier by overmolding the connected end with the carrier material so that the larger connected end is finally embedded in the carrier.

Figure 1:
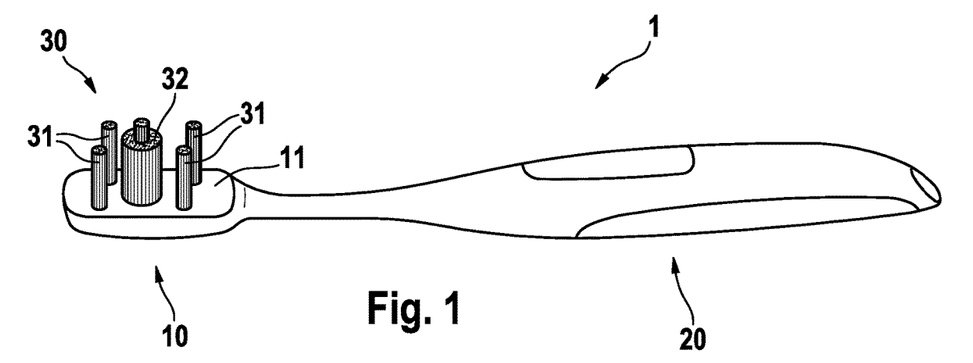
FIG. 1 is a schematic depiction of an example brush, in particular a brush that was made by the herein proposed manufacturing method.
Figure 3A:
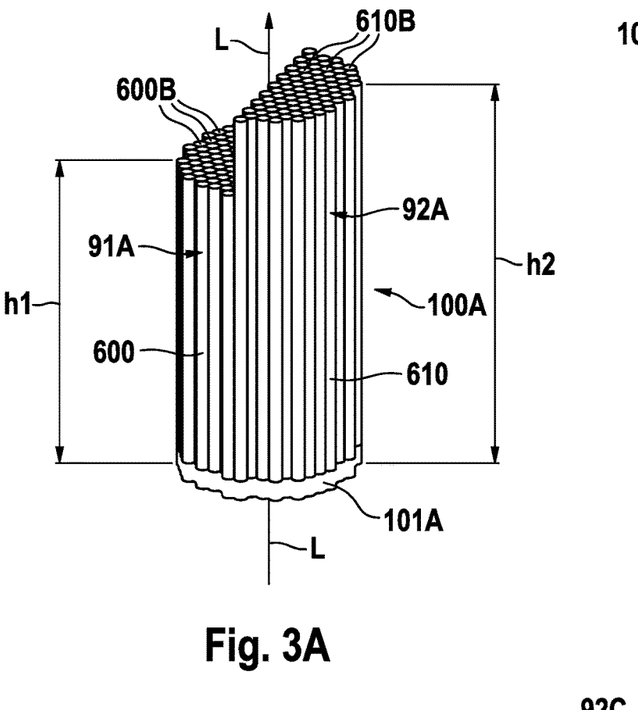
FIG. 3A is a schematic depiction of a first embodiment of a final tuft made by the herein proposed manufacturing method, which final tuft has been assembled from two pre-tufts each having a semi-circular cross section, but where one pre-tuft has a greater length than the other pre-tuft.
Figure 3B:
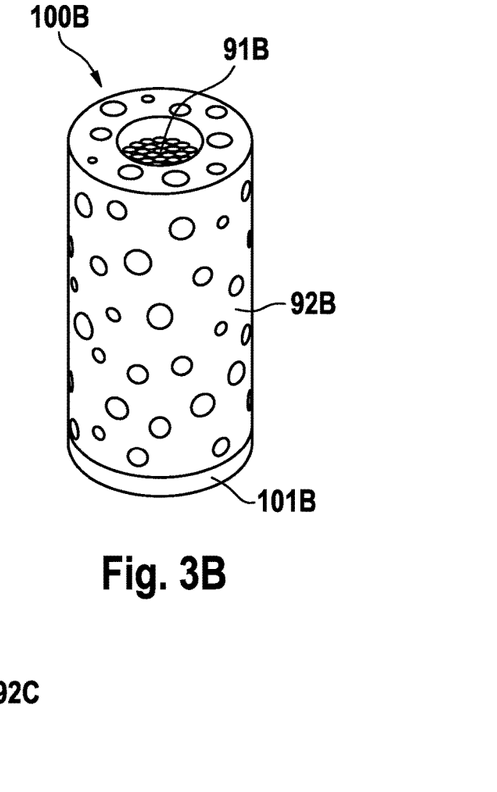
FIG. 3B is a schematic depiction of a second embodiment of a final tuft made by the herein proposed manufacturing method, which final tuft is made from a first pre-tuft and a second tuft element made from a sponge-like material that surrounds the first pre-tuft.
Figure 3C:
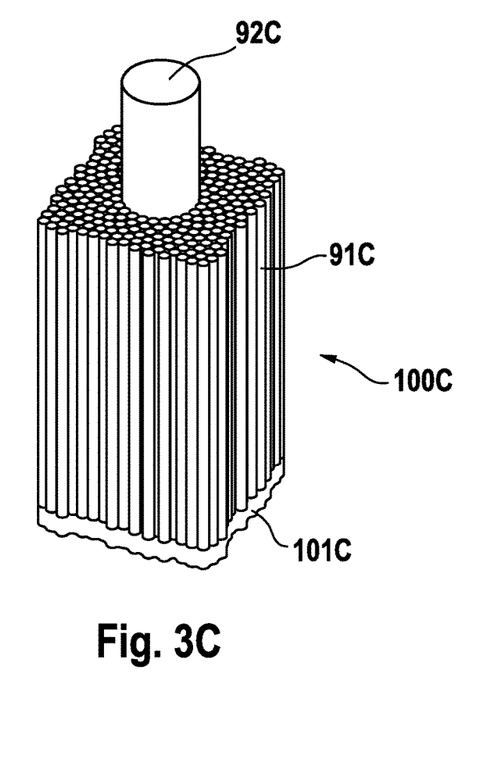
FIG. 3C is a schematic depiction of a third embodiment of a final tuft made by the herein proposed manufacturing method, which final tuft is made from a first pre-tuft having a square cross section with a central hole extending through the full length of the first pre-tuft and a second tuft element made from a thermoplastic elastomer, which second tuft element is disposed in the central hole of the first pre-tuft and projects beyond the second ends of the plurality of first filaments.

FIG. 1 is a schematic depiction of an example brush 1, here a toothbrush, that comprises a brush head 10 and a brush handle 20. Brush elements 30 are attached to a mounting surface 11 of the brush head 10. The brush elements 30 here comprise several simple tufts 31 that each comprises a plurality of filaments and a final tuft 32 in accordance with the present disclosure, which final tuft 32 may in particular be made by a manufacturing method proposed in the present description. Some example embodiments of final tufts are shown in FIGS. 3A-C.

In the following, the proposed manufacturing method is described by in detail describing example method steps that are schematically depicted in FIGS. 2A-2D. FIG. 2E is a side view onto an example connected end of a final tuft made by the described manufacturing method and FIG. 2F shows a final tuft attached to a brush. The here described method steps are to be understood as a non-limiting example and in particular alternative or additional method steps may be considered, some of which are described in the following as well.

Figure 2A:
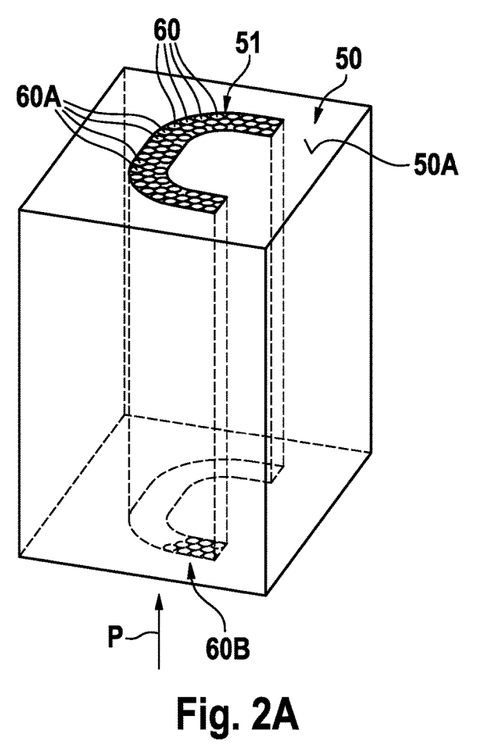
FIG. 2A shows in a schematic manner one step of an example manufacturing method proposed herein, where in this step a plurality of first filaments each having a first and a second end are brought into a first predetermined shape so that the first ends of the first filaments are arranged on a common flat contour.

FIG. 2A schematically shows one example method step of the proposed manufacturing method. A plurality of first filaments 60, each having a first end 60A and a second end 60B, are brought together (e.g. by picking them from a filament reservoir) and are arranged in a first predetermined shape, which first predetermined shape is here a half hollow cylinder (the first predetermined shape has a cross-sectional shape that is C-like). Obviously, any other shape may be chosen by the skilled person as well. The first predetermined shape is here defined by a bore hole 51 in a form 50. The first filaments 60 may have been pushed into the bore hole 51 as indicated by arrow P. The first ends 60A of the first filaments 60 are all arranged on a common contour, which here is the extension of the flat upper surface 50A of the form 50. A flat cover may have been placed at the top of the form 50 so that the first ends 60A were stopped by the cover when they were pushed into the bore hole 51. Instead of lying on the flat contour being an extension of the flat top surface 50A of the form, the first ends 60A may lie on a different common contour, e.g. the first ends 60A of the first filaments 60 may lie on a flat contour that is recessed with respect to the upper surface 50A of the form 50. A cover may then be used in the process of pushing the first filaments 60 into the bore hole 51 that has a projection that positively fits into the bore hole 51. Obviously, such a cover may also have another stopping surface for stopping the first ends 60A of the first filaments 60 so that the first ends 60A may lie on a common contour that is curved. The form 50 may be a single piece form or may be assembled from two (or more) form halves (or form parts). Instead of a form 50 that extends over the full length of the first filaments 60, the first filaments may be brought into the first predetermined shape by holding the first filaments close to their first ends 60A by a gripper.

While the herein shown examples always show a predetermined shape that has a constant cross section, this is not to be understood as limiting. The filaments may each have a different angle of inclination so that a twisted tuft results. Patent application EP 2 910 143 A1 generally describes examples of twisted tufts and is incorporated herein by reference. Further, the pre-tuft may also be inclined with respect to a flat contour on which the first ends of the first filaments are arranged.

Figure 2B:
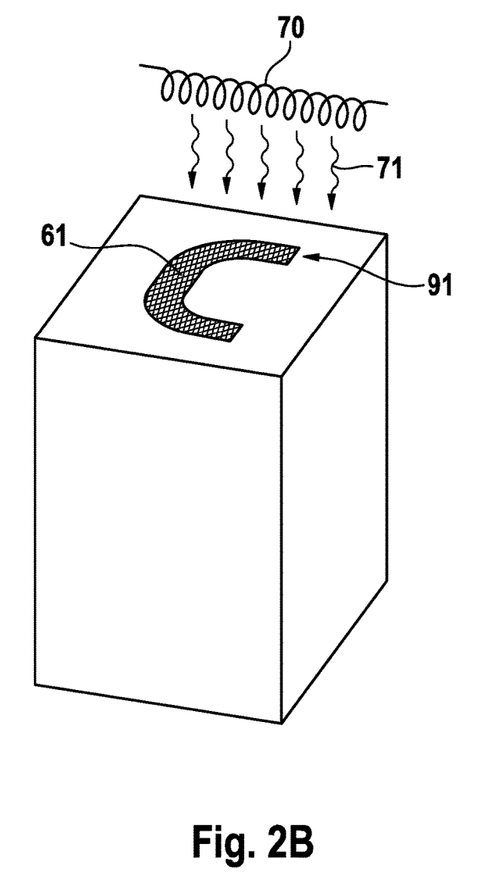
FIG. 2B shows in a schematic manner a further step of the example manufacturing method, where heat is applied to the first ends of the first filaments so that the first ends at least partially melt and a connected first end is formed, thus defining a first pre-tuft made from the plurality of first filaments having the first predetermined shape.

FIG. 2B schematically shows a further step of the proposed manufacturing method. Here, heat 71 is applied from a heating device 70 to the first ends 60A of the first filaments 60 being held in the first predetermined shape so that the first ends 60A at least partially melt and the molten material connects once the provision of heat 71 is stopped. A connected first end 61 of solidified material is thus formed. As a result, the connected first filaments 60 form a first pre-tuft 91 that can essentially be handled like a single tuft element. It is sufficient that the first ends 60A only partially melt at their very ends so that a relatively thin connected first end 61 is formed by the solidified molten material that allows treating the first pre-tuft 91 as a single tuft element and keeps the first pre-tuft 91 in the first predetermined shape. It is envisaged that the connected first end has just the same extension as the unconnected first ends of the first filaments (i.e. the extension is not changed) as this allows bringing together the first connected end of the first pre-tuft with another tuft element. In some embodiments, a projection of the first connected end of the first pre-tuft may be removed, e.g. by grinding.

The heating device 70 may be realized as a device irradiating heat radiation (i.e. thermal radiation such as infrared radiation or other high intensity light readily absorbed by the first ends 60A of the first filaments). Instead of emitting heat radiation, the heating device 70 may be realized as a contact heating device and the heat may be applied by a hot stamp getting into contact with the first ends 60A of the first filaments 60. A hot stamp may in particular be used to induce a final predetermined surface of the connected first end 61 of the first pre-tuft 91. Alternatively, heat may be applied by a heating device 70 that applies a hot gas stream (e.g. heated air). Further, heat may also applied by a convective flow of heat, e.g. the first ends of the first filaments may be placed with some distance above a heat source (e.g. a hot plate) and the heat may then be applied by convection of the heated gas (e.g. air).

In order to allow the first filaments 60 to melt, they may be made from a thermoplastic material such as polyamide (e.g. PA 6 or PA 12) or polybutylene terephthalate (PBT), while other suitable materials are possible as well. The first filaments may also comprise more than one material (e.g. the filaments may be co-extruded filaments or may be coated with a second material). The first filaments may also comprise or consist of one or more thermoplastic elastomer (TPE) materials.

Alternatively or additionally, the first ends 60A of the first filaments 60 may be connected by applying an adhesive onto the first ends 60A. While plastic materials as mentioned before may be glued together by a suitable adhesive (e.g. polyamide may be glued using a cyanoacrylate based adhesive such as Cyanolit® 200 available from Panacol-Elosol GmbH, Steinbach/Taunus, Germany), an adhesive may in particular be useful if the first filaments are made from a material that does not melt under application of heat (e.g. natural rubber, polyurethane, or animal hair) or if a the first filaments are a mixture of filaments made from different materials having different melting temperatures.

Generally, the plurality of first filaments may be a mixture of filaments of different types (e.g. a mixture of different materials, different size (e.g. diameter), different geometry (e.g. cross-sectional shape), and/or different color), which shall not exclude that all first filaments are of the same type.

Figure 2C:
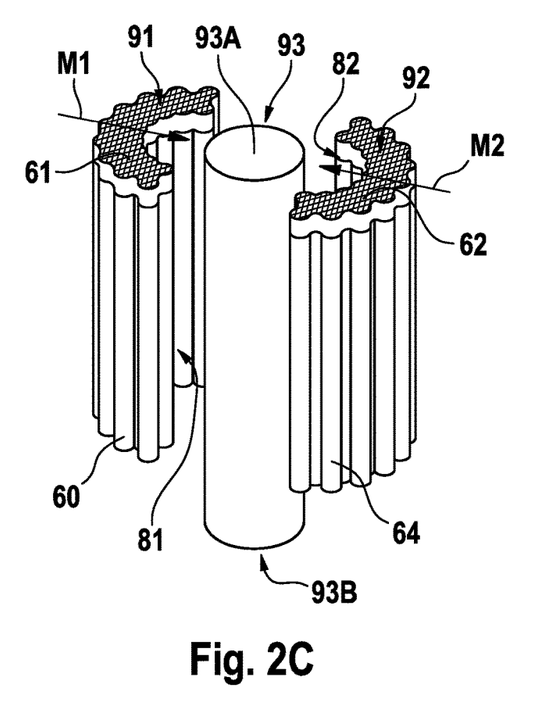
FIG. 2C shows in a schematic manner another step of the example manufacturing method, wherein a first pre-tuft is provided, a second tuft element is provided, and a second pre-tuft is provided.

FIG. 2C is a schematic depiction of another step in the proposed manufacturing method. A first pre-tuft 91 made from first filaments 60 having a connected first end 61 is brought together with a second tuft element 93 and in the present case a second pre-tuft 92 made from second filaments 64 having a connected first end 62. The second tuft element 93 has a first end 93A and a second end 93B. The second pre-tuft 92 has the same predetermined shape as the first pre-tuft 91, namely a half hollow cylinder (i.e. the first and second pre-tuft have a C-shaped cross section). In the shown embodiment, the first and second pre-tufts 91 and 92 have the same length, while the second tuft element 93 is longer. In other embodiments of this type, the first and second pre-tufts have different length and the second tuft element has also the same length as the pre-tufts or has a smaller length than the pre-tufts. In the shown embodiment, the first pre-tuft 91 has a half-cylindrical recess 81 extending the full longitudinal length of the first pre-tuft 91 and the second pre-tuft 92 has a half-cylindrical recess 82 extending the full longitudinal length of the second pre-tuft 92. The second tuft element 93 has a cylindrical shape that positively fits into the cylindrical hole that is formed when the first and the second pre-tuft are brought together so that the two half-cylindrical recesses combine into a cylindrical hole that is enveloped by a hollow cylinder formed from the first and second pre-tufts 91, 92. The second tuft element 93 may be a single element made from a thermoplastic elastomer. FIG. 2C shows an intermediate stage were the three tuft parts 91, 92, and 93 still need to be brought together completely as indicated by arrows M1 and M2 in order to form a semi-finished final tuft. The manufacturing of a final tuft is shown and discussed with reference to FIG. 2D.

Generally, as had been discussed before, a final tuft may be assembled from a first pre-tuft (being a first tuft element) and a second tuft element. Generally, the at least two tuft elements are brought together into a second predetermined shape (in the discussed example shown in FIGS. 2C-2D, three tuft elements are brought together into a cylindrical shape). The connected first end of the first pre-tuft and the first end of at least the second tuft element are aligned with each other so that they lie on a common contour (such as a flat contour).

Figure 2D:
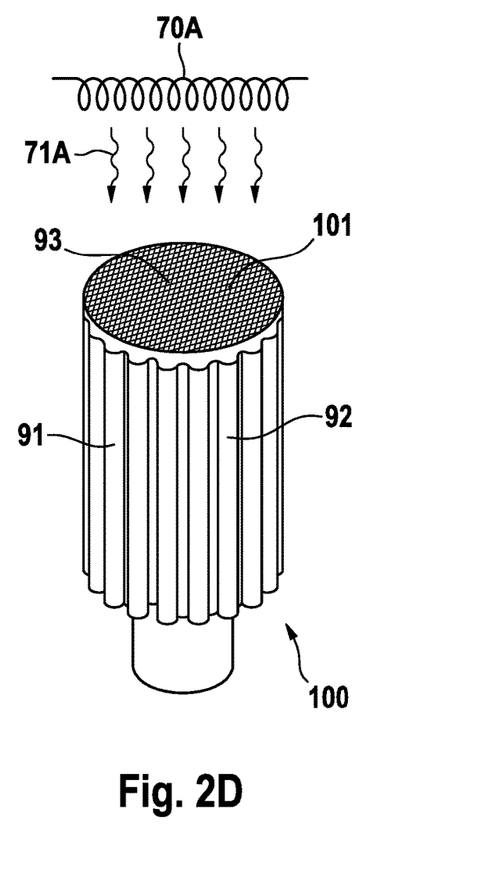
FIG. 2D shows in a schematic manner an even further step of the example manufacturing method, where the three tuft parts shown in FIG. 2C have been put together into a second predetermined shape and heat is applied to the ends of the tuft parts so that they melt and a connected end of a final tuft is formed.
Figure 2E:
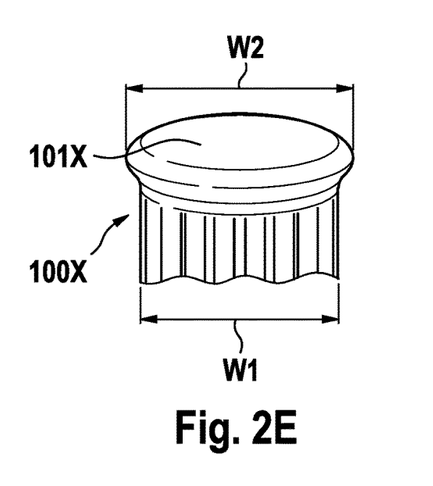
FIG. 2E is a side-view onto a schematic depiction of a connected end of a final tuft, showing that the connected end may in particular be broader in a width direction of the final tuft than the final tuft itself.
Figure 2F:
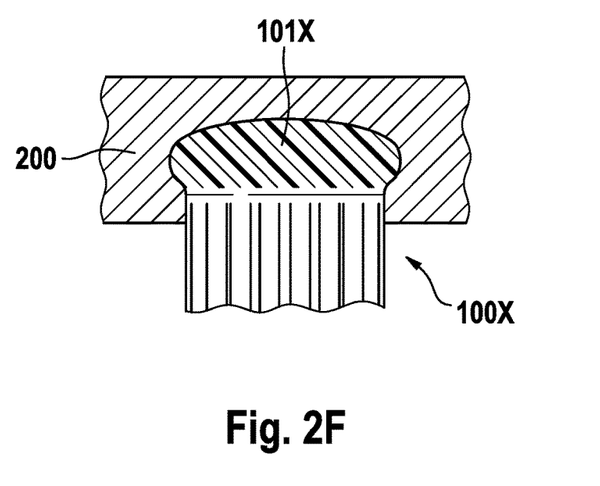
FIG. 2F is a cut view onto a final tuft that is attached to a brush, where the final tuft became attached by embedding its connected end into the brush material.

FIG. 2D schematically shows a further step of the proposed manufacturing method. Here, heat 71A is applied from a heating device 70A to the connected first end 61 of the first pre-tuft, to the connected first end 62 of the second pre-tuft, and to the first end 93A of the second tuft element 93. The three tuft elements 91, 92, and 93 are held in the second predetermined shape. At least the ends of the three tuft elements 91, 92, and 93 are made from a thermoplastic material so that the first ends 61, 62, 93A at least partially melt and the molten material connects (and solidifies) once the provision of heat 71 is stopped and a final tuft 100 is formed. Due to the connected end 101 of the formed final tuft 100, the assembled final tuft 100 can be treated as a single tuft element. As has been mentioned before, the proposed manufacturing method provides complex final tufts in which the various tuft parts are precisely separated from each other, where other technologies may e.g. suffer from mixing of filaments, i.e. where filaments relating to one tuft portion go astray in the manufacturing steps and re-emerge in another tuft portion.

FIG. 2E is a schematic side-view onto the connected end 101X of a final tuft 100X, where it can be seen that the connected end 101X has a width W2 that is wider than the width W1 of the final tuft 100X. This can be achieved by applying an amount of heat to the connected first end of the first pre-tuft and at least to the first end of the second tuft element so that not only a small amount of the material melts but so that a larger amount of material melts, which then forms a blob of molten material. Such a wider connected end can be used to connect the final tuft to a carrier (which forms at least a part of a brush body or is the brush body) that is molded around the connected end of the final tuft, as is generally known in the art. FIG. 2F shows the final stage, where the final tuft 100X having a wide connected end 101X is attached to a brush embedded in a tuft carrier 200 that may be a portion of a brush. It is noted here, that such a widened connected end is an optional feature and depending on the intended tuft retention and on the bonding properties between the tuft and the material that is used for the carrier in which the final tuft will be seated, W2 may be equal to W1. The final tuft may also become attached to a carrier by gluing the final tuft onto a carrier or into a hole provided in a carrier.

Alternatively, instead of applying heat as shown in FIG. 2D, the connected first end of the first pre-tuft and at least the first end of the second tuft element can be connected with each other by applying an adhesive as has been described before for the step of connecting the first ends of the plurality of filaments forming the first pre-tuft.

FIGS. 3A-3C show various example embodiments of final tufts that can be made by the proposed manufacturing method.

FIG. 3A is a depiction of a final tuft 100A having a circular cross section in a plane perpendicular to the length extension direction of the final tuft 100A (until height level h1 and then the cross-sectional shape becomes semi-circular until height level h2). The final tuft 100A is made from a first pre-tuft 91A made from a plurality of first filaments 600 and a second tuft element 92A that here is realized as a second pre-tuft made from a plurality of second filaments 610. The final tuft 100A has a connected end 101A. The first pre-tuft 91A has a semi-circular cross-section and the second pre-tuft 92A has a semi-circular cross section, so that the final tuft 100A has a general cylindrical cross section until height level h1. The first pre-tuft 91A has a height h1 in length extension direction L and the second pre-tuft 92A has a somewhat larger height h2 in length extension direction L. The first filaments 600 and the second filaments 610 may in particular differ from each other in another aspect than just their length, e.g. in filament color, filament material, filament diameter, filament cross sectional shape etc.

FIG. 3B shows a second example embodiment of a final tuft 100B made by the proposed manufacturing method. The final tuft consists of a first pre-tuft 91B and of a second tuft element 92B. Here, the first pre-tuft 91B is made from first filaments and has a cylindrical cross-sectional shape. The second tuft element 92B is a sponge-like element, e.g. a polyurethane sponge that has a ring-like cross-sectional shape (i.e. the second tuft element 92B is a hollow cylinder). TPE and rubber are also materials suitable for forming a sponge. The first pre-tuft 91B positively fits into the inner hollow of the second tuft element 92B. The final tuft 100B has a connected end 101B. As a polyurethane sponge material may not necessarily melt, the connected end 101B may have been formed by gluing the connected first end of the first pre-tuft 91B and the first end of the second tuft element 92B (the sponge element) together with a suitable adhesive. The sponge material may be filled with an application material that is released during use of the brush comprising the final tuft.

FIG. 3C is a depiction of a third example embodiment of a final tuft 100C made in accordance with the proposed manufacturing method. The final tuft 100C comprises a first pre-tuft 91C that has a square cross-sectional shape having a cylindrical hole extending the full length of the first pre-tuft 91C. While it is here indicated that the cylindrical hole is located in the center of the first pre-tuft 91C, the cylindrical hole may be located also off-centric. A second tuft element 92C is here realized as an elastomeric cylinder that positively fits into the cylindrical hole in the first pre-tuft 91C. The second tuft element 92C has a greater height than the first pre-tuft 91C and thus projects above the here flat contour formed by the second ends of the first filaments forming the first pre-tuft 91C. The final tuft 100C has a connected end 101C. Instead of a cylindrical elastomeric element, the second tuft element may be realized a hollow cylinder and the final tuft may become part of a dispensing system via which an application material is delivered from a reservoir to the functional end of the final tuft.

It is obvious that a skilled person understands that the shown example embodiments are not limiting and that the various concepts that had been discussed can be combined in any suitable manner, e.g. the second tuft element 92A of FIG. 3A may be realized as a sponge-like element or as an elastomeric element. Any other cross-sectional shape of the final tuft may be chosen. Instead of two tuft elements (first pre-tuft and second tuft element), a final tuft may be assembled from any number of tuft elements, e.g. three, four, five etc.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a toothbrush, comprising the steps of:
    a. providing a plurality of first filaments, each first filament having a first end and a second end;
    b. bringing the plurality of first filaments into a first predetermined shape such that the first ends of the first filaments are arranged side by side on a common contour;
    c. forming a first pre-tuft by fixedly interconnecting the first ends of the plurality of first filaments so that a first pre-tuft having the first predetermined shape and a connected first end is formed, wherein the first pre-tuft is structured and configured to be handled like a single tuft element;
    d. providing at least one second tuft element formed independently from the step of forming a first pre-tuft, wherein the second tuft element comprises a plurality of second filaments;
    e. bringing the at least one second tuft element having a first end and a second end together with the first pre-tuft into a second predetermined shape such that the first end of the second tuft element and the connected first end of the first pre-tuft are arranged side by side on a common contour;
    f. fixedly connecting the connected first end of the first pre-tuft and the first end of the at least second tuft element so that a final tuft having the second predetermined shape and a connected end is formed; and
    g. attaching the final tuft to a brush body by overmolding the connected end of the final tuft with a plastic material, thereby forming at least a portion of the brush body.

2. The method in accordance with claim 1, wherein the step of forming a first pre-tuft comprises heating the first ends of the first filaments to cause the first ends of the first filaments to at least partially melt and subsequently cooling the molten ends whereby the molten ends non-separably connect with one another to form the connected first end.

3. The method in accordance with claim 1, wherein the step of forming a first pre-tuft comprises applying an adhesive to the first ends of the first filaments so that the connected first end is formed.

4. The method in accordance with claim 1, wherein the first pre-tuft has a recess or bore-hole extending along the full length of the first pre-tuft between the connected first end and the second ends, the recess or bore-hole being arranged for receiving at least a portion of the at least second tuft element.

5. The method in accordance with claim 4, comprising the further steps of pushing the at least second tuft element into the recess of the first pre-tuft, wherein the first pre-tuft has a C-shaped cross section in a plane perpendicular to its length extension, and deforming the first pre-tuft in a plane perpendicular to the length extension of the first pre-tuft until the second predetermined shape is reached.

6. The method in accordance with claim 1, wherein the second tuft element is a second pre-tuft made by the steps of
    providing the plurality of second filaments, each second filament having a first end and a second end;
    bringing the plurality of second filaments into a predetermined shape such that the first ends of the second filaments are arranged side by side on a common contour; and
    fixedly connecting the first ends of the plurality of second filaments so that the second pre-tuft having the predetermined shape with a connected first end is formed.

7. The method in accordance with claim 6, wherein the method comprises (a) applying a first temperature to the first ends of the first filaments and applying a second temperature to the first ends of the second filaments wherein the first temperature is different from the second temperature, (b)

applying a first adhesive to the first ends of the first filaments and applying a second adhesive to the first ends of the second filaments, and (c) applying an adhesive connecting technology to the first end of the first filaments and applying a heat-based connecting technology to the first ends of the second filaments, or vice versa.

8. The method in accordance with claim 7, wherein the first adhesive comprises a material composition that is different from a material composition of the second adhesive.

9. The method in accordance with claim 1, wherein the second tuft element comprises at least one elastomeric element or a sponge-like element.

10. The method in accordance with claim 1, wherein the second ends of the filaments of the first pre-tuft and the second end of the at least second tuft element are arranged at different height levels with respect to a length extension of the final tuft.

11. The method in accordance with claim 1, wherein a plurality of filaments each having a first end and a second end are brought together with the first pre-tuft such that the connected first end of the first pre-tuft and the first ends of the filaments are arranged side-by-side on a common contour.

12. The method in accordance with claim 1, further comprising the steps of bringing at least a third tuft element having a first end and a second end together with the first pre-tuft and the second tuft element into the second predetermined shape such that the first end of the third tuft element, the first end of the second tuft element, and the connected first end of the first pre-tuft are arranged side by side on a common contour and of fixedly connecting the connected first end of the first pre-tuft, the first end of the second tuft element, and the first end of the third tuft element so that the final tuft having the second predetermined shape is formed.

13. The method in accordance with claim 12, wherein the first pre-tuft and the second tuft element are connected first, and then the third tuft element is connected thereto.

14. The method in accordance claim 1, wherein the step of forming a first pre-tuft results in a formation of a connected end that extends beyond the second predetermined shape of the final tuft in at least one width direction perpendicular to the length extension direction of the final tuft.

15. A brush made by the method of claim 1.

16. The brush in accordance with claim 15, wherein the second tuft element comprises an elastomeric element or a sponge-like element.

* * * * *